United States Patent
Zeh et al.

(10) Patent No.: US 11,374,740 B2
(45) Date of Patent: Jun. 28, 2022

(54) CONTROLLER AREA NETWORK KEY EXCHANGE

(71) Applicant: Infineon Technologies AG, Neubiberg (DE)

(72) Inventors: Alexander Zeh, Munich (DE); Anjana Ramamoorthy, Munich (DE)

(73) Assignee: Infineon Technologies AG, Neubiberg (DE)

( * ) Notice: Subject to any disclaimer, the term of this patent is extended or adjusted under 35 U.S.C. 154(b) by 100 days.

(21) Appl. No.: 16/818,830

(22) Filed: Mar. 13, 2020

(65) Prior Publication Data

US 2021/0288792 A1 Sep. 16, 2021

(51) Int. Cl.
*H04L 9/08* (2006.01)
*H04L 9/32* (2006.01)

(52) U.S. Cl.
CPC ............ *H04L 9/0819* (2013.01); *H04L 9/085* (2013.01); *H04L 9/0861* (2013.01)

(58) Field of Classification Search
CPC ...... H04L 9/0819; H04L 9/085; H04L 9/0861
See application file for complete search history.

(56) References Cited

U.S. PATENT DOCUMENTS

| | | | |
|---|---|---|---|
| 10,355,859 B2 | 7/2019 | Brown | |
| 2008/0039052 A1* | 2/2008 | Knowles | H04L 51/38 455/412.1 |
| 2008/0112355 A1* | 5/2008 | Krishnakumar | H04W 84/22 370/328 |
| 2011/0069699 A1* | 3/2011 | Balasaygun | H04M 1/2535 370/352 |
| 2017/0019382 A1* | 1/2017 | Jain | H04L 63/06 |
| 2017/0310472 A1* | 10/2017 | Garcia-Morchon | H04L 9/083 |
| 2019/0044721 A1* | 2/2019 | Schultz | H04L 63/107 |
| 2019/0238325 A1* | 8/2019 | Takemori | G09C 1/00 |
| 2020/0153618 A1* | 5/2020 | Bhattacharya | H04L 9/0841 |
| 2021/0075600 A1* | 3/2021 | Trevethan | H04L 9/0819 |

FOREIGN PATENT DOCUMENTS

| | | |
|---|---|---|
| CN | 103825733 A | 5/2014 |
| CN | 110495134 A | 11/2019 |
| CN | 110870250 A | 3/2020 |

OTHER PUBLICATIONS

"CAN in Automation (CiA): SIG CAN XL." [Online], Available: https://www.can-cia.org/groups/technical-groups/technical-committee-tc/ig-layer-12/sig-can-xl/. [Accessed: Mar. 13, 2020].

IEEE, "IEEE Standard for Local and metropolitan area networks—Media Access Control (MAC) Security", IEEE Std 802.1AE™-2018, 239 pages.

* cited by examiner

*Primary Examiner* — Darshan I Dhruv
(74) *Attorney, Agent, or Firm* — Harrity & Harrity, LLP

(57) ABSTRACT

A bus-based communication system, may include a communication bus connecting a plurality of nodes. A first node, of the plurality of nodes, may receive a first message on the communication bus, the first message having been broadcast on the communication bus by a second node of the plurality of nodes. The first message may include a modular exponentiation associated with a private key of the second node. The first node may compute a shared secret key, associated with the plurality of nodes, based at least in part on the modular exponentiation and a private key of the first node.

20 Claims, 14 Drawing Sheets

| Node | Private key | Transfer 1 | Transfer 2 | Transfer 3 | Transfer 4 | Transfer 5 |
|---|---|---|---|---|---|---|
| A | $a$ | $P_a$ | $P_{ab}$ | $P_c$ | $P_{bc}$ | $P_{ac}$ |
| B | $b$ | $P_a$ | $P_{ab}$ | $P_c$ | $P_{bc}$ | $P_{ac}$ |
| C | $c$ | $P_a$ | $P_{ab}$ | $P_c$ | $P_{bc}$ | $P_{ac}$ |
| Secret | | | $P_{cab}$ | | $P_{abc}$ | $P_{bac}$ |
| | | | C has secret | | A has secret | B has secret |

FIG. 3A

| Node | Private key | Transfer 1 | Transfer 2 | Transfer 3 | Transfer 4 | Transfer 5 | Transfer 6 | Transfer 7 | Transfer 8 | |
|---|---|---|---|---|---|---|---|---|---|---|
| A | a | $P_a$ | $P_{ab}$ | $P_{abc}$ | $P_{abd}$ | $P_d$ | $P_{cd}$ | $P_{bcd}$ | $P_{acc}$ | |
| B | b | $P_a$ | $P_{ab}$ | $P_{abc}$ | $P_{abd}$ | $P_d$ | $P_{cd}$ | $P_{bcd}$ | $P_{acd}$ | A has secret |
| C | c | $P_a$ | $P_{ab}$ | $P_{abc}$ | $P_{abd}$ | $P_d$ | $P_{af}$ | $P_{bcd}$ | $P_{acd}$ | |
| D | d | $P_a$ | $P_{ab}$ | $P_{abc}$ | $P_{abd}$ | $P_{af}$ | $P_{cd}$ | $P_{bcd}$ | $P_{acd}$ | |
| Secret | | | | $P_{dabc}$ | $P_{cabd}$ | | | $P_{abcd}$ | $P_{bacd}$ | |

D has secret | C has secret | A has secret | B has secret

FIG. 3B

| Node | Private key | Transfer 1 | Transfer 2 | Transfer 3 | Transfer 4 | Transfer 5 | Transfer 6 | Transfer 7 | Transfer 8 | Transfer 9 | Transfer 10 | Transfer 11 | Transfer 12 |
|---|---|---|---|---|---|---|---|---|---|---|---|---|---|
| A | $a$ | $P_a$ | $P_{ab}$ | $P_{abc}$ | $P_{abcd}$ | $P_{abce}$ | $P_e$ | $P_{de}$ | $P_{cde}$ | $P_{bcde}$ | $P_{acde}$ | $P_{ade}$ | $P_{abde}$ |
| B | $b$ | $P_a$ | $P_{ab}$ | $P_{abc}$ | $P_{abcd}$ | $P_{abce}$ | $P_e$ | $P_{de}$ | $P_{cde}$ | $P_{bcde}$ | $P_{acde}$ | $P_{ade}$ | $P_{abde}$ |
| C | $c$ | $P_a$ | $P_{ab}$ | $P_{abc}$ | $P_{abcd}$ | $P_{abce}$ | $P_e$ | $P_{de}$ | $P_{cde}$ | $P_{bcde}$ | $P_{acde}$ | $P_{ade}$ | $P_{abde}$ |
| D | $d$ | $P_a$ | $P_{ab}$ | $P_{abc}$ | $P_{abcd}$ | $P_{abce}$ | $P_e$ | $P_{de}$ | $P_{cde}$ | $P_{bcde}$ | $P_{acde}$ | $P_{ade}$ | $P_{abde}$ |
| E | $e$ | $P_a$ | $P_{ab}$ | $P_{abc}$ | $P_{abcd}$ | $P_{abce}$ | $P_e$ | $P_{de}$ | $P_{cde}$ | $P_{bcde}$ | $P_{acde}$ | $P_{ade}$ | $P_{abde}$ |
| Secret | | | | | $P_{eabcd}$ | $P_{dabce}$ | | | | $P_{abcde}$ | $P_{bacde}$ | | $P_{cabde}$ |

E has secret — D has secret — A has secret — B has secret — C has secret

FIG. 3C

| Nodes | Transfers | Formula |
|---|---|---|
| 2 | 2 | n |
| 3 | 5 | n + 2 |
| 4 | 8 | n + n |
| 5 | 12 | n + n + 2 |
| 6 | 16 | n + n + (n-2) |
| 7 | 21 | n + n + (n-2) + 2 |
| 8 | 26 | n + n + (n-2) + (n-4) |
| 9 | 32 | n + n + (n-2) + (n-4) + 2 |
| 10 | 38 | n + n + (n-2) + (n-4) + (n-6) |

FIG. 3D

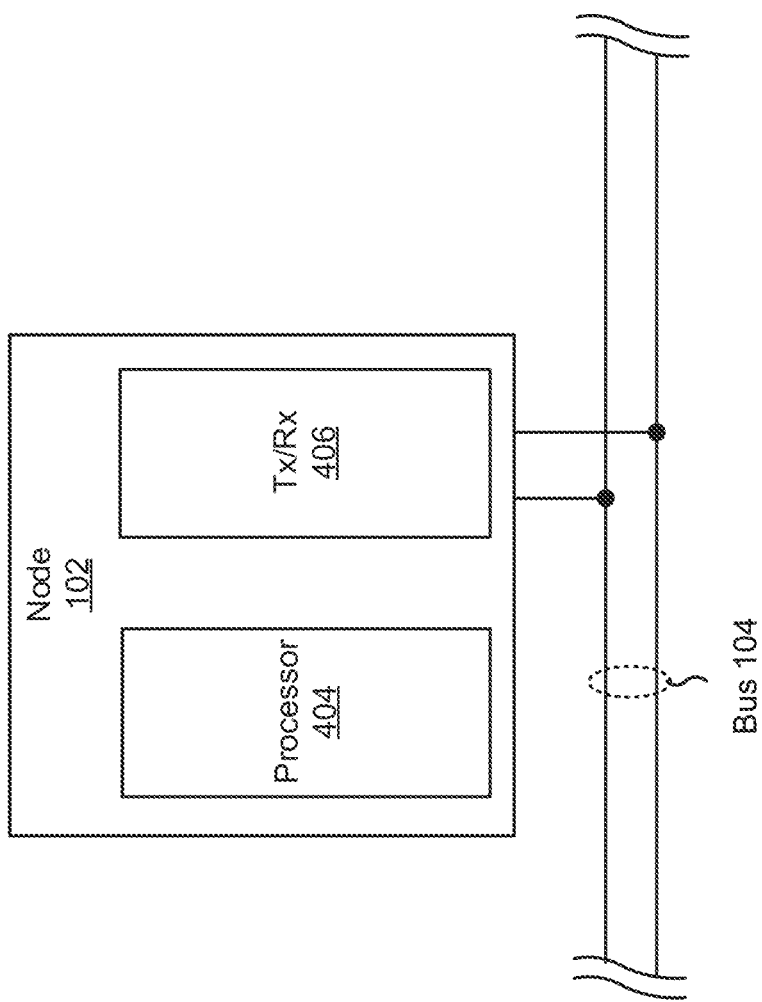

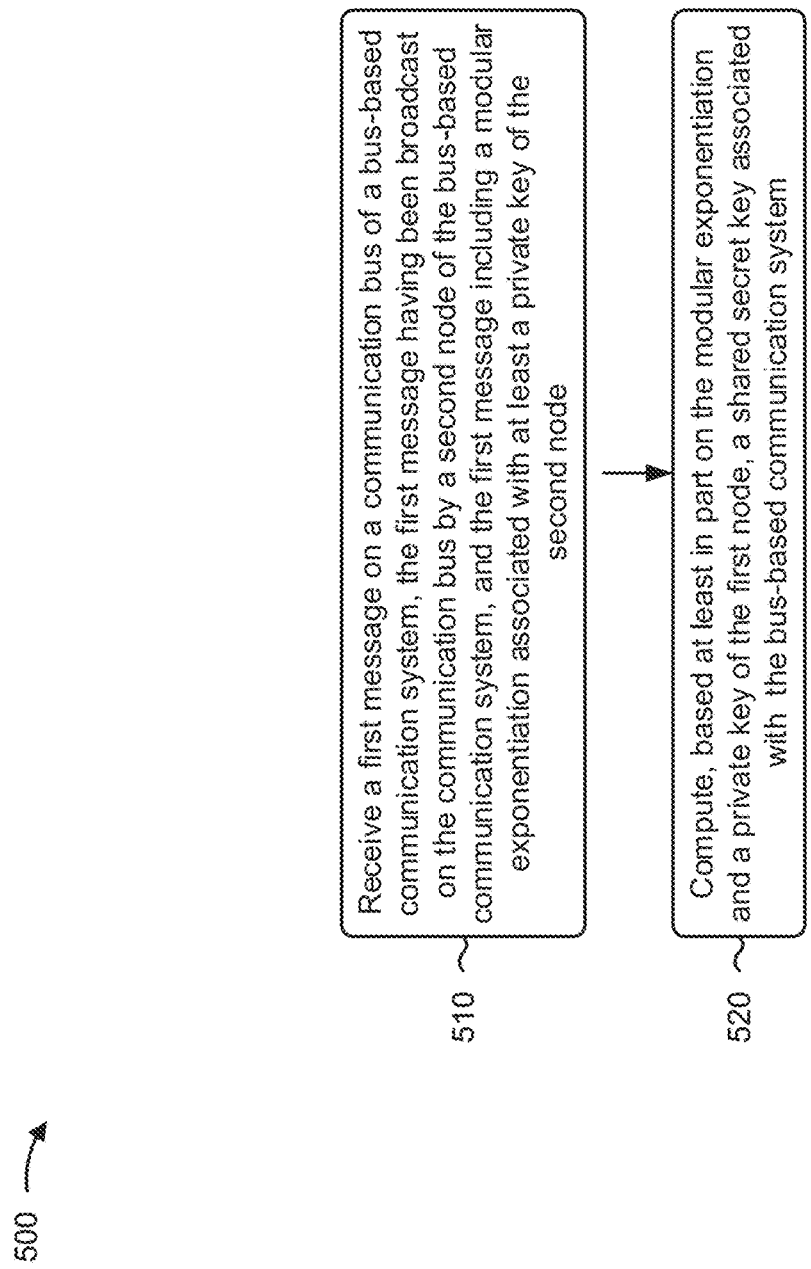

US 11,374,740 B2

CONTROLLER AREA NETWORK KEY EXCHANGE

BACKGROUND

A bus-based communication system, such as a controller area network (CAN), is a network of one or more communication buses that interconnect nodes of a particular system. An individual node can include, for example, a sensor, an actuator, a controller, and/or another device that is used by the system to perform a function. In a vehicle system, a node can correspond to a sensor, an actuator, and/or an Electronic Control Unit (ECU) (e.g., an Engine Control Module (ECM), a Powertrain Control Module (PCM), a Transmission Control Module (TCM), a Brake Control Module (BCM), a Central Control Module (CCM), a Central Timing Module (CTM), a General Electronic Module (GEM), a Body Control Module (BCM), a Suspension Control Module (SCM), and/or the like) that is associated with a function of a vehicle. Nodes within a bus-based communication system communicate with one another via the communication bus using string of bits, or frames, that are serially transmitted and/or received according to a message-based communication protocol. A CAN system is often used in vehicles (e.g., road vehicles, off-road vehicles, marine vehicles, aerial vehicles, and/or the like), and can also be used for other applications (e.g., industrial systems, medical systems, robotics systems, and/or the like).

SUMMARY

According to some possible implementations, a bus-based communication system may include a communication bus connecting a plurality of nodes; and a first node, of the plurality of nodes, configured to: receive a message on the communication bus, the message having been broadcast on the communication bus by a second node of the plurality of nodes, the message including a modular exponentiation associated with a private key of the second node and at least a private key of a third node of the plurality of nodes; and compute a shared secret key, associated with the plurality of nodes, based at least in part on the modular exponentiation and a private key of the first node.

According to some possible implementations, a first node of a bus-based communication system may include one or more processors configured to receive a message on a communication bus of the bus-based communication system, the message having been broadcast on the communication bus by a second node of the bus-based communication system, the message including a modular exponentiation associated with a private key of the second node and at least a private key of a third node of the bus-based communication system; and compute a shared secret key, associated with a plurality of nodes of the bus-based communication system, based at least in part on the modular exponentiation and a private key of the first node, the plurality of nodes including the first node, the second node, and the third node.

According to some possible implementations, a method may include receiving, by a first node in a bus-based communication system, a message on a communication bus of the bus-based communication system, the message having been broadcast on the communication bus by a second node of the bus-based communication system, and the message including a modular exponentiation associated with a private key of the second node and at least a private key of a third node of the bus-based communication system; and computing, by the first node and based at least in part on the modular exponentiation and a private key of the first node, a shared secret key associated with the bus-based communication system.

BRIEF DESCRIPTION OF THE DRAWINGS

FIGS. 3A-3E are diagrams associated with numbers of messages needed to achieve key exchange in a bus-based communication system, in accordance with various aspects of the present disclosure.

FIG. 4 is a diagram of an example of a node of a bus-based communication system at which systems and/or methods described herein may be implemented.

FIG. 5 is a flow chart of an example process associated with providing key exchange in a bus-based communication system, in accordance with various aspects of the present disclosure.

DETAILED DESCRIPTION

The following detailed description of example implementations refers to the accompanying drawings. The same reference numbers in different drawings may identify the same or similar elements.

As described above, a bus-based communication system, such as a CAN, may include a network of one or more communication buses that interconnect nodes of a system (e.g., a vehicle system, an industrial system, a medical system, a robotics system, and/or the like). A node may include a sensor, an actuator, a controller, and/or another device that is used to perform a function of the associated system. In a vehicle, for instance, a node may correspond to a sensor, an actuator, and/or an ECU that is associated with a throttle function, a steering function, a braking function, a gear selection function, and/or another function of the vehicle.

In general, a node of a bus-based communication system may communicate with other nodes on a communication bus via frames (e.g., strings of bits) that are serially transmitted and/or received according to a message-based communication protocol. For example, a node may transmit a frame of dominant and/or recessive bits that can be interpreted by another node as information provided via a sensor, information for controlling an actuator, an operating parameter, an operating condition, and/or the like.

Figure 1A:
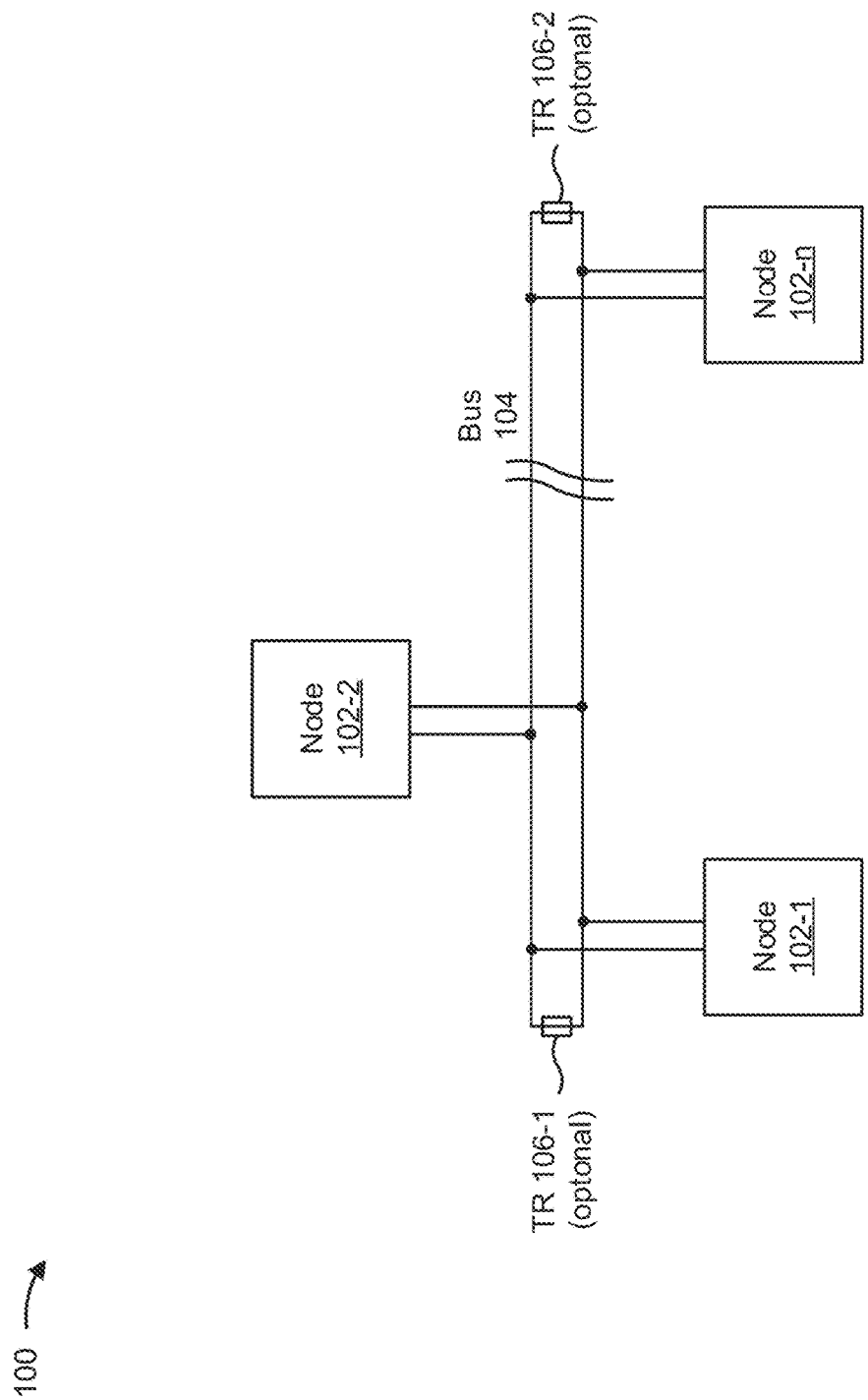
FIGS. 1A and 1B are diagrams illustrating examples associated with a bus-based communication system, in accordance with various aspects of the present disclosure.

FIG. 1A is a diagram illustrating an example of a bus-based communication system, in accordance with various aspects of the present disclosure. FIG. 1A illustrates an example of a bus-based communication system 100 connecting a group of nodes 102 (e.g., node 102-1 through node 102-$n$ ($n>1$)). In the example of FIG. 1A, a communication bus 104 is shown as a two line bus system, which may be implemented as two differential lines. Notably, other implementations of a communication bus are possible. In bus-based communication system 100, a node 102 may selectively apply a direct current (DC) voltage signal across the bus terminals to transmit a dominant bit or a recessive bit. For example, a node 102 may transmit a dominant bit (e.g., a logical "0" bit) by driving the high bus terminal to a high voltage (e.g., 5 VDC) and by driving the low bus terminal to a low voltage (e.g., 0 VDC), and may transmit a recessive bit (e.g., a logical "1" bit) by driving neither bus terminal. The bus terminals may extend between the nodes 102 and enable information (e.g., information provided via a sensor, information for controlling an actuator, an operating parameter, an operating condition, and/or the like) to be exchanged between the nodes 102. As further shown in FIG. 1A, the bus-based communication system 100 may be terminated with (optional) termination resistors 106-1 and 106-2, which may serve to reduce reflections on the communication bus 104 that could otherwise affect signal quality along the communication bus 104. In some cases, the nodes 102 of the bus-based communication system 100 may communicate with one another according to a message-based communication protocol. For example, the node 102-1 may transmit a message as a frame of bits that are serially introduced into the communication bus 104 and serially received by the node 102-2. A frame may generally include one or more designated fields that provide different types of information relating to the message contained in the frame. Notably, in the bus-based communication system 100, a message transmitted by any node 102 is broadcast on the communication bus 104, meaning that any other node 102 can receive the message on the communication bus 104.

Examples of bus-based communication systems in a vehicle include CAN, CAN with flexible data rate (CAN FD), CAN extra large (CAN XL), and local interconnect network (LIN). While implementations described herein are described in the context of CAN variants, such as CAN XL, the techniques described herein may be applied to other types of bus-based communication systems.

An in-vehicle bus-based communication system, such as that shown in FIG. 1A, may have particular attributes reflecting requirements for in-vehicle networks. As an example, the in-vehicle bus-based communication system network may support communication of sensor data to a control unit by data frames being transmitted from the sensor or a control unit of the sensor to a control unit on a higher level. A particular protocol may be used for the data frames or protocol frames communicated between individual nodes or participants of the bus-based communication system. In return or in response to receipt of sensor data, the control unit of the sensor or the control unit on the higher level may communicate information associated with an action to an actuator coupled to the bus. As a particular example, with reference to FIG. 1A, node 102-1 may represent an angle sensor measuring an angle of a brake pedal. Node 102-1 may transmit information indicating the measured angle in one or more protocol frames to node 102-2, which may be an ECU. In response to receiving the information associated with the angle, the node 102-2 may transmit one or more bus frames to node 102-n, which may be a brake actuator. These frames transmitted, when received by the node 102-n, may cause a braking action. Bus-based communications related to such an action are time critical and, therefore, should be transmitted, received, and processed quickly (e.g., in real-time or near real-time). Such timing requirements are not common in a typical communication network.

Further, in-vehicle communication networks typically have a well-defined number of nodes that, generally, remain constant over a lifetime of a vehicle. Likewise, existing links between individual nodes are not likely to be altered over the lifetime of the vehicle and, therefore, a topology of the bus-based communication system is likely to remain constant. In a standard computer network, such a situation is unlikely.

In bus-based communication system 100, authenticity of a protocol frame transmitted over the communication bus 104 of bus-based communication system 100 may be desirable, particularly in association with controlling a function of a vehicle. Taking a braking action as an example, a command causing an emergency braking should not be mistaken for a gentle braking when parking the vehicle in a controlled manner. To this end, an indication of authenticity of a frame communicated between participants of the bus-based communication system is advantageous. In some cases, authenticity of a frame can be provided at a data link layer (layer 2) of a given node 102. In general, indicating authenticity of a protocol frame on a data link layer eliminates involvement of higher layers in authentication of (time-critical) commands communicated between participants of the bus-based communication system.

Further, with increasingly capable entertainment systems and increasing vehicle-to-vehicle communications, there is an increasing susceptibility to malicious commands or protocol frames being injected to a bus-based communication system. Therefore, bus-based communication system 100 may provide data security for frames (e.g., to prevent injection of the malicious frames). In some cases, data security can be provided at the data link layer or at a transport layer (layer 3). In some cases, data security may be provided on one or more other layers (e.g., one or more upper or lower layers) other than the transport layer and the data link layer.

The number and arrangement of devices shown in FIG. 1A are provided as examples. In practice, there may be additional devices, fewer devices, different devices, or differently arranged devices than those shown in FIG. 1A. Furthermore, two or more devices shown in FIG. 1AA may be implemented within a single device, or a single device shown in FIG. 1A may be implemented as multiple, distributed devices. Additionally, or alternatively, a set of devices (e.g., one or more devices) of FIG. 1A may perform one or more functions described as being performed by another set of devices of FIG. 1A. For example, while bus-based communication system 100 is shown with two bus terminals, the communication bus 104 may interconnect the nodes 102 using a different number of bus terminals and/or using a different arrangement of bus terminals that interconnect a different arrangement of nodes 102. As another example, the communication bus 104 may be arranged in another topology, such as a ring topology (e.g., in which ends of the communication bus are electrically coupled to a single master unit). As another example, the communication bus 104 may comprise a plurality of communication buses 104 and/or be in selective communication with one or more additional communication buses 104.

Figure 1B:
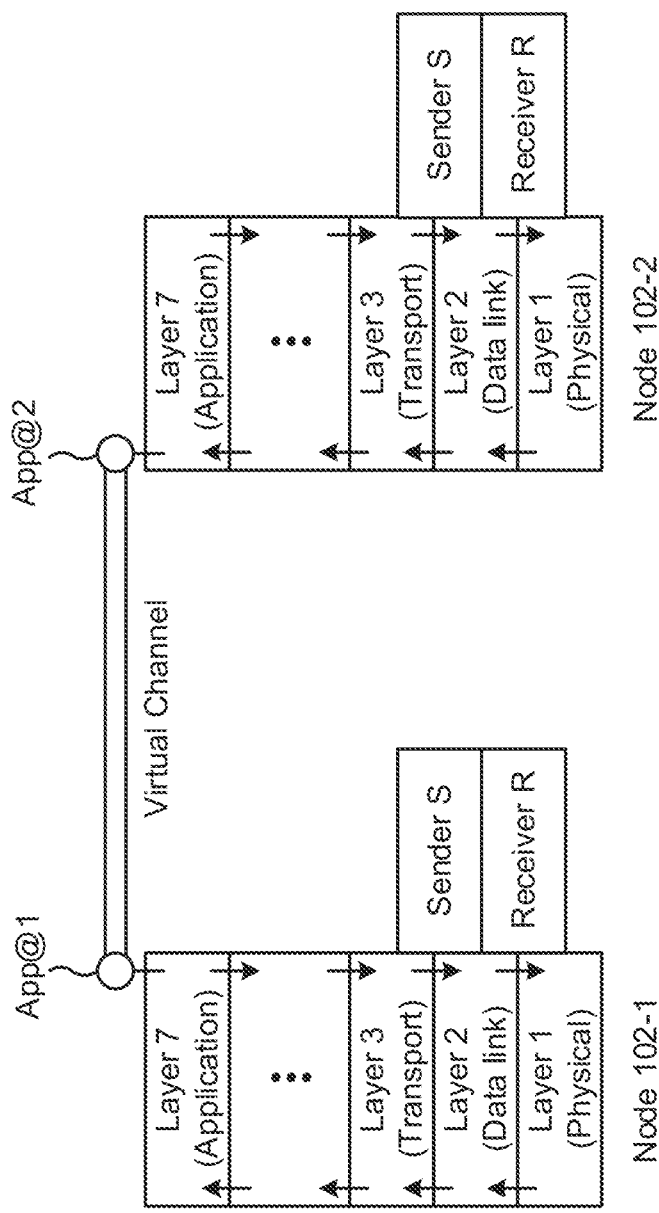

FIG. 1B illustrates an example of a communication stack and virtual channels between a pair of nodes of bus-based communication system 100, with node 102-1 and node 102-2 being shown as an example. As shown in FIG. 1B, communication between node 102-1 and node 102-2 flows in layers that can be categorized according to, for example, the OSI-ISO layer model. The lowest level layer (layer 1) is referred to as the physical layer. Each layer in the model can accept an order from a higher layer, perform some action at its level, and trigger a task in a lower layer by forwarding a request to the lower layer. For example, a command to the data link layer (layer 2) may be received from the transport layer (layer 3), as indicated by the downward arrow between the transport layer and the data link layer. Similarly, a command to the physical layer (layer 1) may be received from the data link layer, as indicated by the downward arrow between the physical layer and the data link layer. The physical layer of node 102-1 may use a connection or link to node 102-2 in order to communicate data on the physical layer to node 102-2. Similarly, node 102-1 may receive data from node 102-2 over the physical link between node 102-1 and node 102-2. Here, the physical layer of node 102-1 may forward the received data to the data link layer and, after processing at the data link layer, the data link layer may forward data to the transport layer. This forwarding is indicated by the upward arrow between the physical layer and the data link layer of node 102-1 and the upward arrow between the data link layer and the transport layer of node 102-1. The protocol flow in node 102-2 is similar to that of node 102-1. Notably, some existing in-vehicle bus-based communication networks do not follow the separation of physical layer and the data link layer as suggested in the OSI-ISO model. To reflect this, a specialty sender S and receiver R are depicted in FIG. 1B as extending over the physical layer and the data link layer.

In some cases, techniques for providing authenticity of data communication in vehicles are implemented in the application layer (layer 7) using a software stack, indicated as App@1 and App@ 2 in FIG. 1B. Further, it may be useful to introduce a concept of virtual channels between node 102-1 and node 102-2 to indicate an authenticated and/or protected communication between two or more participants using the software stacks App@1 and App@2. One example associated with providing security for onboard networks, in a vehicle using software stacks, is secure onboard communication (SEC OC) according to the automotive open system architecture (AUTOSAR) standard.

In general, it may be convenient for original equipment manufacturers to specify the software stacks application for node 102-1 and node 102-2 (e.g., App@1, App@2), which gives freedom in hardware implementation of node 102-1 and node 102-2. As a trade-off, implementing authenticity and/or data security using a software stack may not meet a timing requirement, for example, for a first node (e.g., an actuator) in a bus-based communication system to respond to a command from a second node (e.g., an ECU) in the bus-based communication system. Consider, for example, a braking command sent as a protocol frame from the second node to the first node. Here, if such a communication were to be authenticated and secured using the software stack, all layers for each node would be involved, which may take too long for a reliable braking operation. A further disadvantage of a software stack authenticity and/or data security solution may be the fact that the software stacks may not be properly designed, so that the authenticity and/or security functionality is degraded or even compromised. Therefore, it may in some cases be desirable to limit functionality pertaining to authenticity and/or data security to one or two lower layers of an individual participant to the bus-based communication system. Limiting the authenticity and/or data security functionality to, for example, the data link layer and/or the transport layer may eliminate a need for higher protocol layers to be involved in data integrity and/or data security operations, thereby reducing an amount of time needed to receive, transmit, or process a given communication over the bus-based communication system.

The number and arrangement of layers shown in FIG. 1B are provided as one or more examples. In practice, there may be additional layers, fewer layers, different layers, or differently arranged layers than those shown in FIG. 1B. Furthermore, two or more layers shown in FIG. 1B may be implemented within a single layer, or a single layer shown in FIG. 1B may be implemented as multiple, distributed layers. Additionally, or alternatively, a set of layers (e.g., one or more layers) of FIG. 1B may perform one or more functions described as being performed by another set of layers of FIG. 1B.

A shared secret key can be used to provide data security in a bus-based communication system. The shared secret key should be known to each node of the bus-based communication system to enable a given node to encrypt messages to be transmitted by the given node on a communication bus of the bus-based communication system, as well as to enable the given node to decrypt messages received by the given node on the communication bus (i.e., messages transmitted by other nodes of the bus-based communication system). Conventionally, a shared secret key is preconfigured on nodes of a bus-based communication system (e.g., during system manufacturing or configuration) in order to enable symmetric cryptography between the nodes of the bus-based communication system.

However, a preconfigured shared secret key may be undesirable for a number of reasons. For example, in a case in which the shared secret key needs to be changed (e.g., due to being compromised), the shared secret key needs to be reconfigured on all of the nodes of the bus-based communication system, which may require a process that is complex and/or resource intensive. Further, since the shared secret key cannot be readily changed, data security in a bus-based communication system that uses a preconfigured shared secret key has a higher risk of failure than, for example, a bus-based communication system in which a shared secret key is or can be changed at a given time (e.g., on-demand, for each session, or the like).

Some implementations described herein provide techniques and apparatuses for key exchange in a bus-based communication system. In some implementations, the key exchange mechanism described herein allows nodes 102 of a bus-based communication system 100 to derive a shared secret key at a given time, thereby improving data security while enabling simpler key configuration or reconfiguration (e.g., as compared to a bus-based communication system that uses a preconfigured shared secret key).

In some aspects, as described below, key exchange in a bus-based communication system 100 can be achieved using principles of a Diffie-Hellman (DH) key exchange, but with a reduced number of messages being needed (e.g., as compared to a conventional DH key exchange). Therefore, resource consumption and congestion on communication bus 104 of the bus-based communication system 100 are reduced by using the techniques for key exchange described herein.

In some implementations, key exchange in the bus-based communication system 100 can be performed on a layer that allows relatively large payloads to be transmitted, such as a transport layer (sometimes referred to as a TPsec layer in, for example, a CAN XL system). In some implementations, key exchange on the transport layer is desirable because the larger payloads of the transport layer allow longer messages to be exchanged, meaning that longer shared secret keys can be derived, which improves data security. In some implementations, the shared secret key may be used for cryptographic operations on the data link layer (which may be referred to as a CADsec layer in, for example, a CAN XL system).

FIGS. 2A-2E are diagrams illustrating an example 200 of providing key exchange in a bus-based communication system, in accordance with various aspects of the present disclosure. In the example shown in FIGS. 2A-2E, a bus-based communication system 100 includes a group of nodes 102 identified as Node A, Node B, and Node C. As shown, the group of nodes 102 are connected via a communication bus 104 of bus-based communication system 100. Bus-based communication system 100 of FIGS. 2A-2E may use, for example, CAN XL protocol, CAN FD protocol, CAN protocol, and/or the like. In the example shown in FIGS. 2A-2E the group of nodes 102 each need to derive a shared secret key (e.g., such that data security can be provided for communications among the group of nodes 102).

Figure 2A:
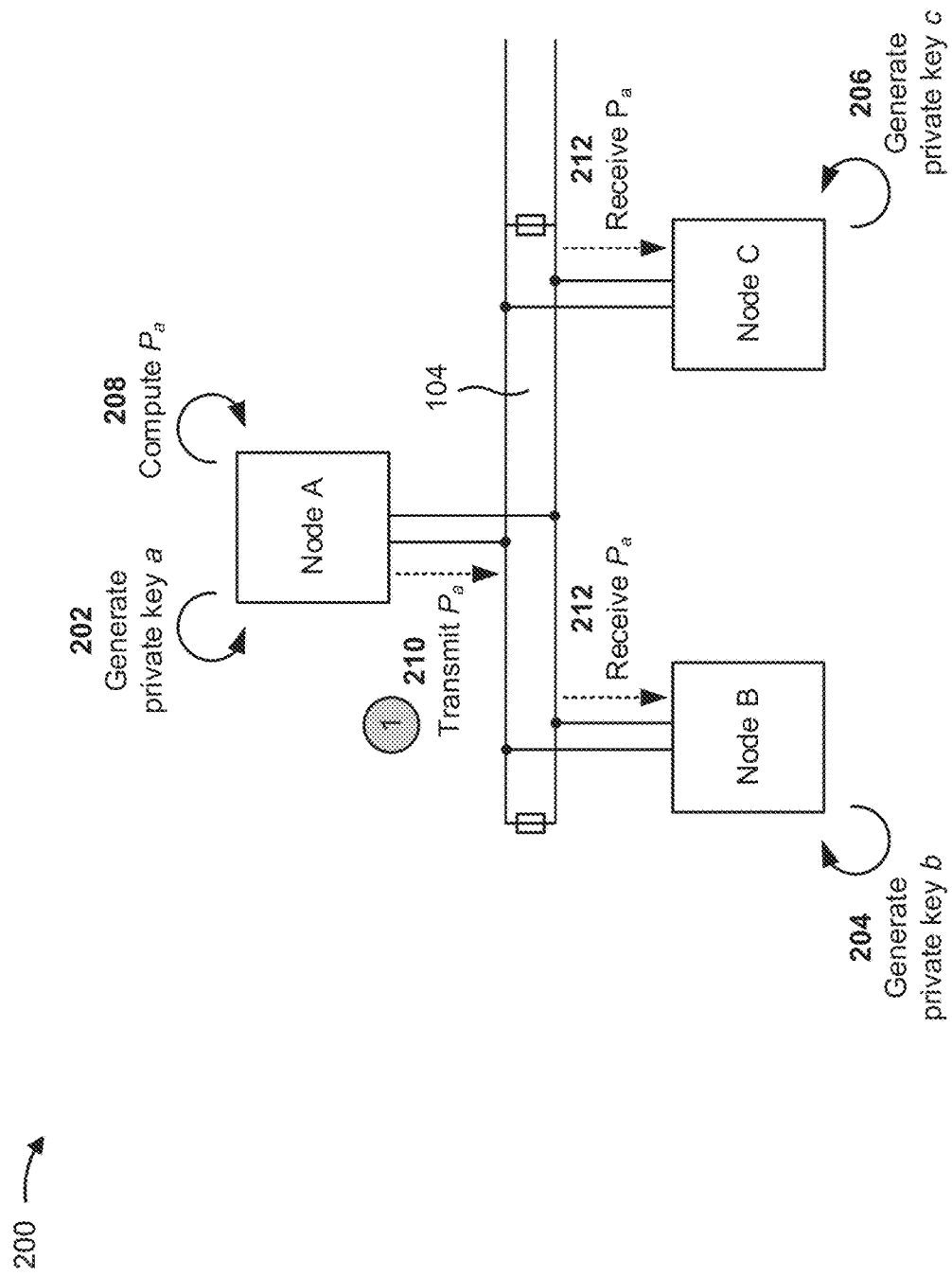
FIGS. 2A-2E are diagrams illustrating an example of key exchange in a bus-based communication system, in accordance with various aspects of the present disclosure.

As shown in FIG. 2A, and by reference 202, Node A may generate a private key a associated with Node A. Similarly, as shown by reference 204, Node B may generate a private key b associated with Node B and, as shown by reference 206, Node C may generate a private key c associated with Node C. A private key may be, for example, a random integer value that is generated or selected by a node 102 (e.g., such that the private key is within a configured range of integer values). For example, Node A may generate private key a by selecting a random integer value from a configured range of integer values, Node B may generate private key b by selecting a random integer value from the configured range of integer values, and Node C may generate private key c by selecting a random integer value from the configured range of integer values.

As shown by reference 208, Node A may compute a modular exponentiation $P_a$ associated with private key a. In some implementations, Node A may compute the modular exponentiation $P_a$ based at least in part on a set of parameters. The set of parameters may include one or more parameters that are known to each node 102 in bus-based communication system 100. For example, the set of parameters may include a prime number g and a prime number p, where p is large (e.g., at least 512 bits) and g is a primitive root modulo p. Notably, the set of parameters (e.g., prime number p and prime number g) need not be kept secret.

In some implementations, Node A may compute the modular exponentiation $P_a$ based at least in part on the set of parameters and private key a. For example, when the set of parameters includes prime number g and prime number p, Node A may compute the modular exponentiation $P_a$ using the following formula:

$$P_a = g^a \bmod p$$

As shown by reference 210, after computing the modular exponentiation $P_a$, Node A may transmit a message including the modular exponentiation $P_a$ on communication bus 104. Here, because the communication bus 104 connects each node 102 of the bus-based communication system 100, the message transmitted by Node A is, in effect, broadcast on the communication bus 104, meaning that every other node 102 (including both Node B and Node C) of the bus-based communication system 100 can receive the message including the modular exponentiation $P_a$. Therefore, as shown by reference 212, both Node B and Node C may receive the message including the modular exponentiation $P_a$. In some implementations, the message including the modular exponentiation $P_a$ may be provided on the transport layer (e.g., to allow longer messages to be exchanged for providing increased security, as described above).

Figure 2B:
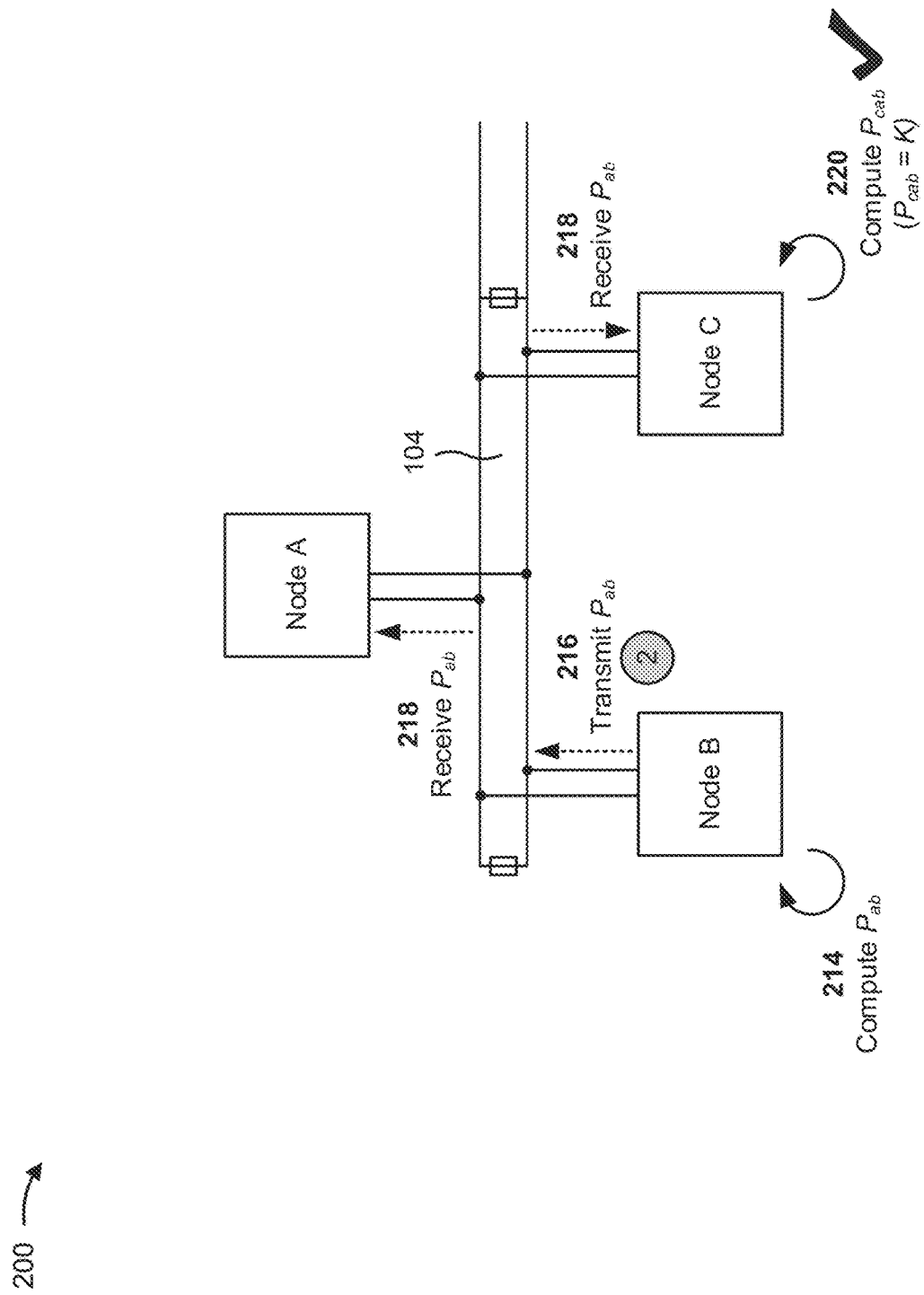

As shown in FIG. 2B by reference 214, Node B may compute a modular exponentiation $P_{ab}$ associated with the private key a and the private key b.

In some implementations, Node B may compute the modular exponentiation $P_{ab}$ based at least in part on the set of parameters, the modular exponentiation $P_a$, and the private key b. For example, when the set of parameters includes prime number g and prime number p, Node B may compute the modular exponentiation $P_{ab}$ as follows:

$$P_{ab} = (P_a)^b \bmod p$$

As shown by reference 216, after computing the modular exponentiation $P_{ab}$, Node B may transmit a message including the modular exponentiation $P_{ab}$ on communication bus 104. Again, because the communication bus 104 connects each node 102 of the bus-based communication system 100, the message transmitted by Node B is, in effect, broadcast on the communication bus 104, meaning that every other node 102 (including both Node A and Node C) of the bus-based communication system 100 can receive the message including the modular exponentiation $P_{ab}$. Therefore, as shown by reference 218, both Node A and Node C may receive the message including the modular exponentiation $P_{ab}$. In some implementations, the message including the modular exponentiation $P_{ab}$ may be provided on the transport layer.

As shown by reference 220, Node C may receive the message including the modular exponentiation $P_{ab}$ (i.e., the modular exponentiation associated with the private key a and the private key b), and may compute a shared secret key K based at least in part on the modular exponentiation $P_{ab}$, where the shared secret key K is the modular exponentiation $P_{cab}$. In some implementations, Node C may compute the modular exponentiation $P_{cab}$ based at least in part on the set of parameters, the modular exponentiation $P_{ab}$, and the private key c. For example, when the set of parameters includes prime number g and prime number p, Node C may compute the modular exponentiation $P_{cab}$ as follows:

$$K = P_{cab} = (P_{ab})^c \bmod p$$

As indicated by the check mark in FIG. 2B, Node C has derived the shared secret key K at reference 220.

Figure 2C:
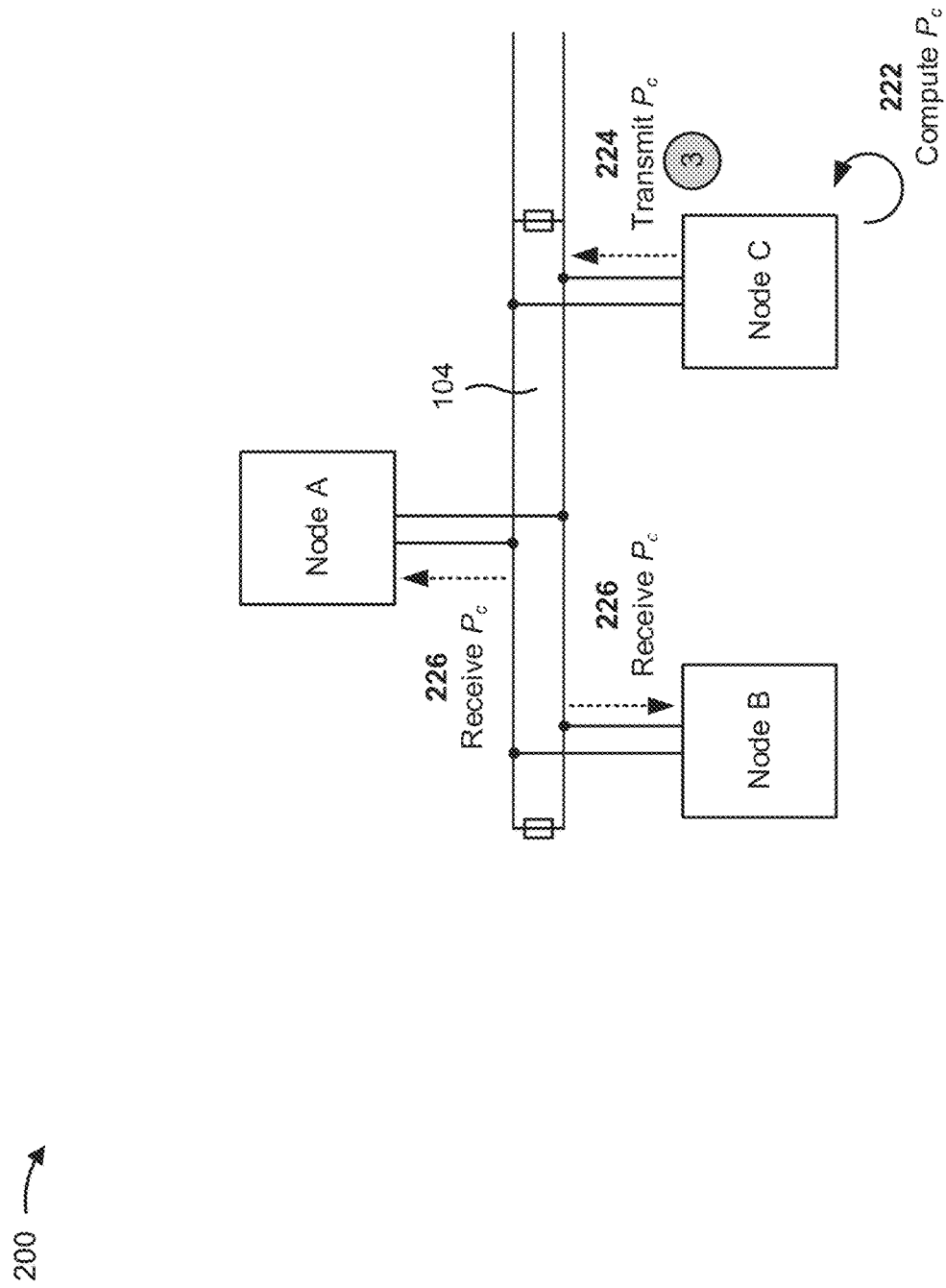

Next, as shown in FIG. 2C by reference 222, Node C may compute a modular exponentiation $P_c$ associated with private key c. In some implementations, Node C may compute the modular exponentiation $P_c$ based at least in part on the set of parameters and private key c. For example, when the set of parameters includes prime number g and prime number p, Node C may compute the modular exponentiation $P_c$ using the following formula:

$$P_c = g^c \bmod p$$

As shown by reference 224, after computing the modular exponentiation $P_c$, Node C may transmit a message including the modular exponentiation $P_c$ on communication bus 104. Here, because the communication bus 104 connects each node 102 of the bus-based communication system 100, the message transmitted by Node C is, in effect, broadcast on the communication bus 104, meaning that every other node 102 (including both Node B and Node A) of the bus-based communication system 100 can receive the message including the modular exponentiation $P_c$. Therefore, as shown by reference 226, both Node B and Node A may receive the message including the modular exponentiation $P_c$. In some implementations, the message including the modular exponentiation $P_c$ may be provided on the transport layer.

Figure 2D:
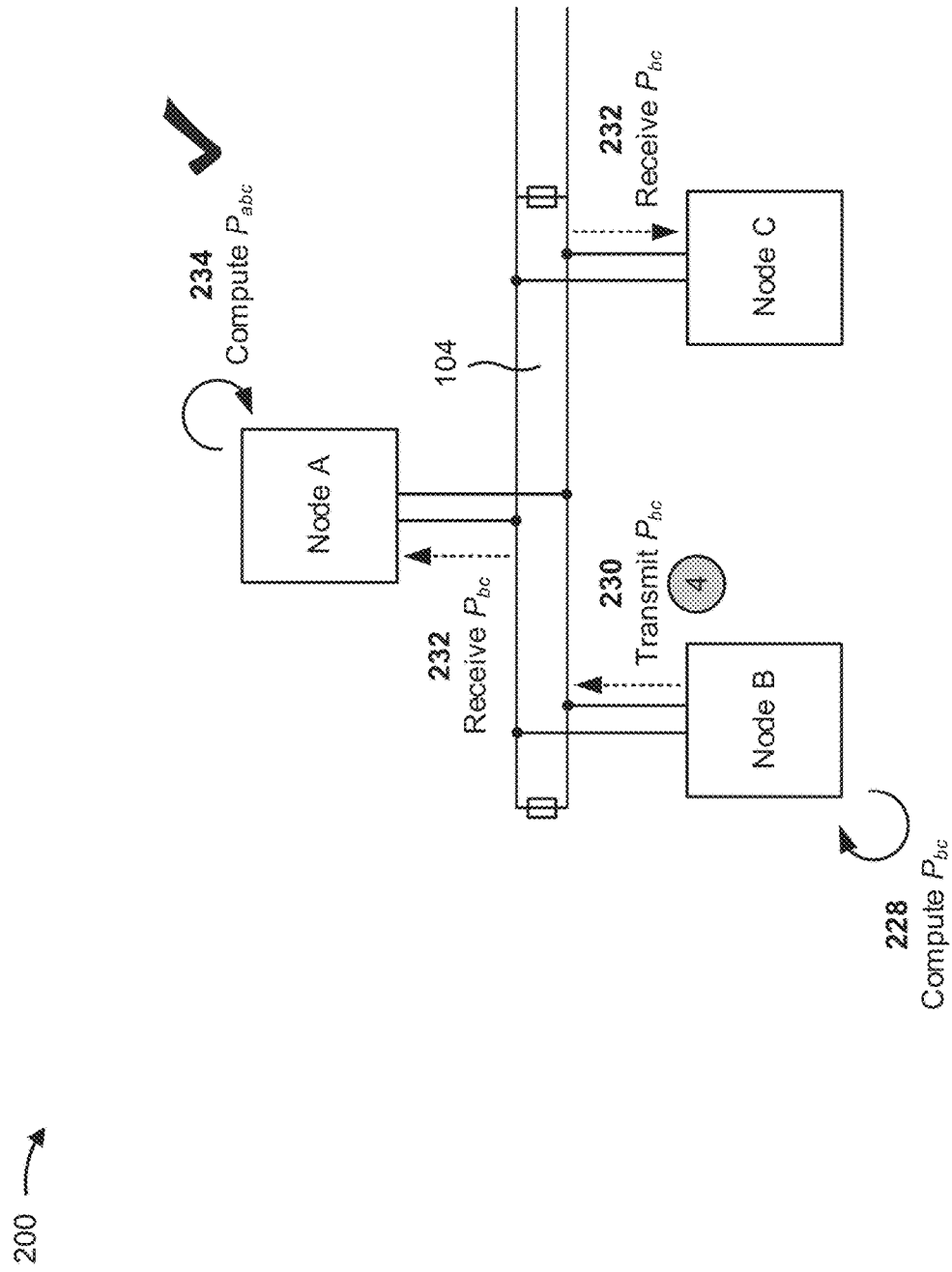

As shown in FIG. 2D by reference 228, Node B may compute a modular exponentiation $P_{bc}$ associated with the private key b and the private key c.

In some implementations, Node B may compute the modular exponentiation $P_{bc}$ based at least in part on the set of parameters, the modular exponentiation $P_c$, and the private key b. For example, when the set of parameters includes prime number g and prime number p, Node B may compute the modular exponentiation $P_{bc}$ as follows:

$$P_{bc} = (P_c)^b \bmod p$$

As shown by reference 230, after computing the modular exponentiation $P_{bc}$, Node B may transmit a message including the modular exponentiation $P_{bc}$ on communication bus 104. Again, because the communication bus 104 connects each node 102 of the bus-based communication system 100, the message transmitted by Node B is, in effect, broadcast on the communication bus 104, meaning that every other node 102 (including both Node A and Node C) of the bus-based communication system 100 can receive the message including the modular exponentiation $P_{bc}$. Therefore, as shown by reference 232, both Node A and Node C may receive the message including the modular exponentiation $P_{bc}$. In some implementations, the message including the modular exponentiation $P_{bc}$ may be provided on the transport layer.

As shown by reference 234, Node A may receive the message including the modular exponentiation $P_{bc}$ (i.e., the modular exponentiation associated with the private key b and the private key c), and may compute a shared secret key K based at least in part on the modular exponentiation $P_{bc}$, where the shared secret key K is the modular exponentiation $P_{abc}$. In some implementations, Node A may compute the modular exponentiation $P_{abc}$ based at least in part on the set of parameters, the modular exponentiation $P_{bc}$, and the private key a. For example, when the set of parameters includes prime number g and prime number p, Node A may compute the modular exponentiation $P_{abc}$ as follows:

$$K = P_{abc} = (P_{bc})^a \bmod p$$

As indicated by the check mark in FIG. 2D, Node A has derived the shared secret key K at reference 234. Notably, the shared secret key K derived by Node A is identical to that derived by Node C since the following relationship holds true:

$$P_{cab} = (((g^a \bmod p)^b \bmod p)^c \bmod p) = (((g^c \bmod p)^b \bmod p)^a \bmod p) = P_{abc}$$

Figure 2E:
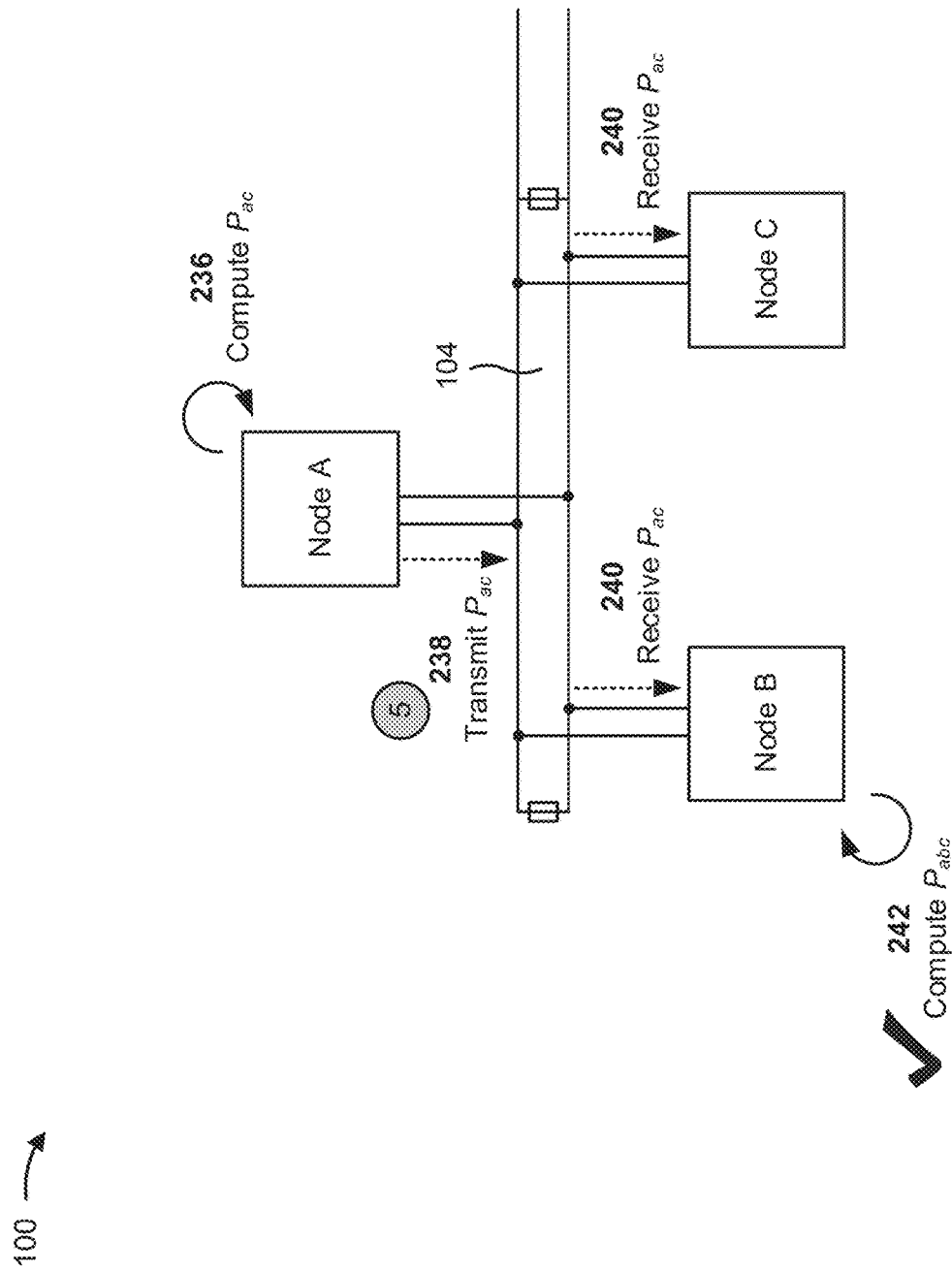

Next, as shown in FIG. 2E by reference 236, Node A may compute a modular exponentiation $P_{ac}$ associated with the private key a and the private key c.

In some implementations, Node A may compute the modular exponentiation $P_{ac}$ based at least in part on the set of parameters, the modular exponentiation $P_c$, and the private key a. For example, when the set of parameters includes prime number g and prime number p, Node A may compute the modular exponentiation $P_{ac}$ as follows:

$$P_{ac} = (P_c)^a \bmod p$$

Notably, because Node C has already broadcast the message including modular exponentiation $P_c$ on the communication bus 104, Node A already has knowledge of the modular exponentiation $P_c$, meaning that there is no need for Node C to send another message including the modular exponentiation $P_c$.

As shown by reference 238, after computing the modular exponentiation $P_{ac}$, Node A may transmit a message including the modular exponentiation $P_{ac}$ on communication bus 104. Again, because the communication bus 104 connects each node 102 of the bus-based communication system 100, the message transmitted by Node A is, in effect, broadcast on the communication bus 104, meaning that every other node 102 (including both Node A and Node C) of the bus-based communication system 100 can receive the message including the modular exponentiation $P_{ac}$. Therefore, as shown by reference 240, both Node B and Node C may receive the message including the modular exponentiation $P_{ac}$. In some implementations, the message including the modular exponentiation $P_{ac}$ may be provided on the transport layer.

As shown by reference 242, Node B may receive the message including the modular exponentiation $P_{ac}$ (i.e., the modular exponentiation associated with the private key a and the private key c), and may compute a shared secret key K based at least in part on the modular exponentiation $P_{ac}$, where the shared secret key K is the modular exponentiation $P_{bac}$. In some implementations, Node B may compute the modular exponentiation $P_{bac}$ based at least in part on the set of parameters, the modular exponentiation $P_{ac}$, and the private key b. For example, when the set of parameters includes prime number g and prime number p, Node B may compute the modular exponentiation $P_{bac}$ as follows:

$$K = P_{bac} = (P_{ac})^b \bmod p$$

As indicated by the check mark in FIG. 2E, Node B has derived the shared secret key K at reference 242. Notably, the shared secret key K derived by Node B is identical to that derived by Nodes B and C since the following relationship holds true:

$$P_{bac} = (((g^c \bmod p)^a \bmod p)^b \bmod p) = P_{cab} = P_{abc}$$

In this example, while an eavesdropper listening to the communication bus 104 may be able to obtain the messages carrying the modular exponentiations $P_a$, $P_{ab}$, $P_c$, $P_{bc}$, and/or $P_{ac}$, the eavesdropper cannot use any combination of these values to efficiently reproduce the shared secret key K (i.e., $P^{bac}$, $P^{cab}$ or $P^{abc}$).

Notably, in the example shown in FIGS. 2A-2E, only five messages are required to enable Nodes A, B, and C to derive the shared secret key K (the five messages are numbered in gray circles in FIGS. 2A-2E). In a conventional DH key exchange involving three parties, six messages would be required. The reduction in the number of messages is enabled by the structure of the bus-based communication system 100 that provides broadcasting of a given message on the communication bus 104. As described below, the reduction in the number of messages increases as the number of nodes 102 in the bus-based communication system 100 increases.

As indicated above, FIGS. 2A-2E are provided merely as examples. Other examples may differ from what is described with regard to FIGS. 2A-2E.

FIGS. 3A-3C are diagrams illustrating examples of a number of messages needed to achieve key exchange in bus-based communication systems 100 having various numbers of nodes 102. In FIGS. 3A-3C, each "Transfer" column indicates a message transmission on the communication bus 104, and a highlighted row in a given "Transfer" column indicates the node 102 that is transmitting a given message.

FIG. 3A is a diagram illustrating an example of the number of messages required to achieve key exchange in a bus-based communication system 100 having three nodes 102. The example shown in FIG. 3A corresponds to the example shown in FIGS. 2A-2E. As shown in FIG. 3A (and as illustrated in FIGS. 2A-2E), five message transfers are needed to enable all three nodes 102 of the bus-based communication system 100 to derive the shared secret key K. As described above, in a conventional DH key exchange involving three parties, six messages would be required.

FIG. 3B is a diagram illustrating an example of the number of messages required to achieve key exchange in a bus-based communication system 100 having four nodes 102. The key exchange in the example shown in FIG. 3B may be performed in a manner similar to that described above in association with FIGS. 2A-2E. As shown in FIG.

3B, eight message transfers are needed to enable all four nodes 102 of the bus-based communication system 100 to derive the shared secret key K. In a conventional DH key exchange involving four parties, 12 messages would be required.

FIG. 3C is a diagram illustrating an example of the number of messages required to achieve key exchange in a bus-based communication system 100 having five nodes 102. The key exchange in the example shown in FIG. 3C may be performed in a manner similar to that described above in association with FIGS. 2A-2E. As shown in FIG. 3C, 12 message transfers are needed to enable all five nodes 102 of the bus-based communication system 100 to derive the shared secret key K. In a conventional DH key exchange involving five parties, 20 messages would be required.

As noted above, the reduction in the number of messages is enabled by the structure of the bus-based communication system 100 that provides broadcasting of a given message on the communication bus 104. Notably, the message reduction afforded by the techniques described herein also exists in the case of using a so-called divide and conquer approach for a key exchange in the bus-based communication system 100 (e.g., as compared to using the divide and conquer approach for a conventional DH key exchange).

A general algorithm for performing key exchange in the bus-based communication system 100 is as follows: each node i (i=1, ..., n) has a respective private key (e.g., $N_1$=a, $N_2$=b, $N_3$=c, $N_n$=z), P is a generator polynomial, Q is an intermediate result that can be public, and Qs is the shared secret key. As a first step, for i=1 ... n, node i computes Q=$N_i$×Q and broadcasts a result (such that node n and node n−1 can derive the shared secret key Qs. As a second step, for i=n ... 1, node i computes Q=$N_i$×Q and broadcasts a result (such that node 1 and node 2 can derive the shared secret key Qs. As a third step, for i=1 ... n−4, node i computes Q=$N_{i,n,n-1}$×Q and broadcasts a result (such that node n−2 and node n−3 can derive the shared secret key Qs). Next, if a number of nodes left to obtain the shared secret key is one, then two more messages are needed to establish the shared secret key Qs. This may be the case after the second step is performed in, for example, a five node scenario (n=5). Alternatively, if the number of nodes left to obtain the shared secret key is greater than one, then the third step can be repeated over the remaining nodes.

FIG. 3D is a diagram illustrating a number of messages required to achieve key exchange in bus-based communication systems 100 of various sizes in the manner described above. As shown in FIG. 3D, the number of messages required to achieve key exchange in a given bus-based communication system 100 can be determined based on the number of nodes 102 (identified as n in FIG. 3D) included in the bus-based communication system 100.

Figure 3E:
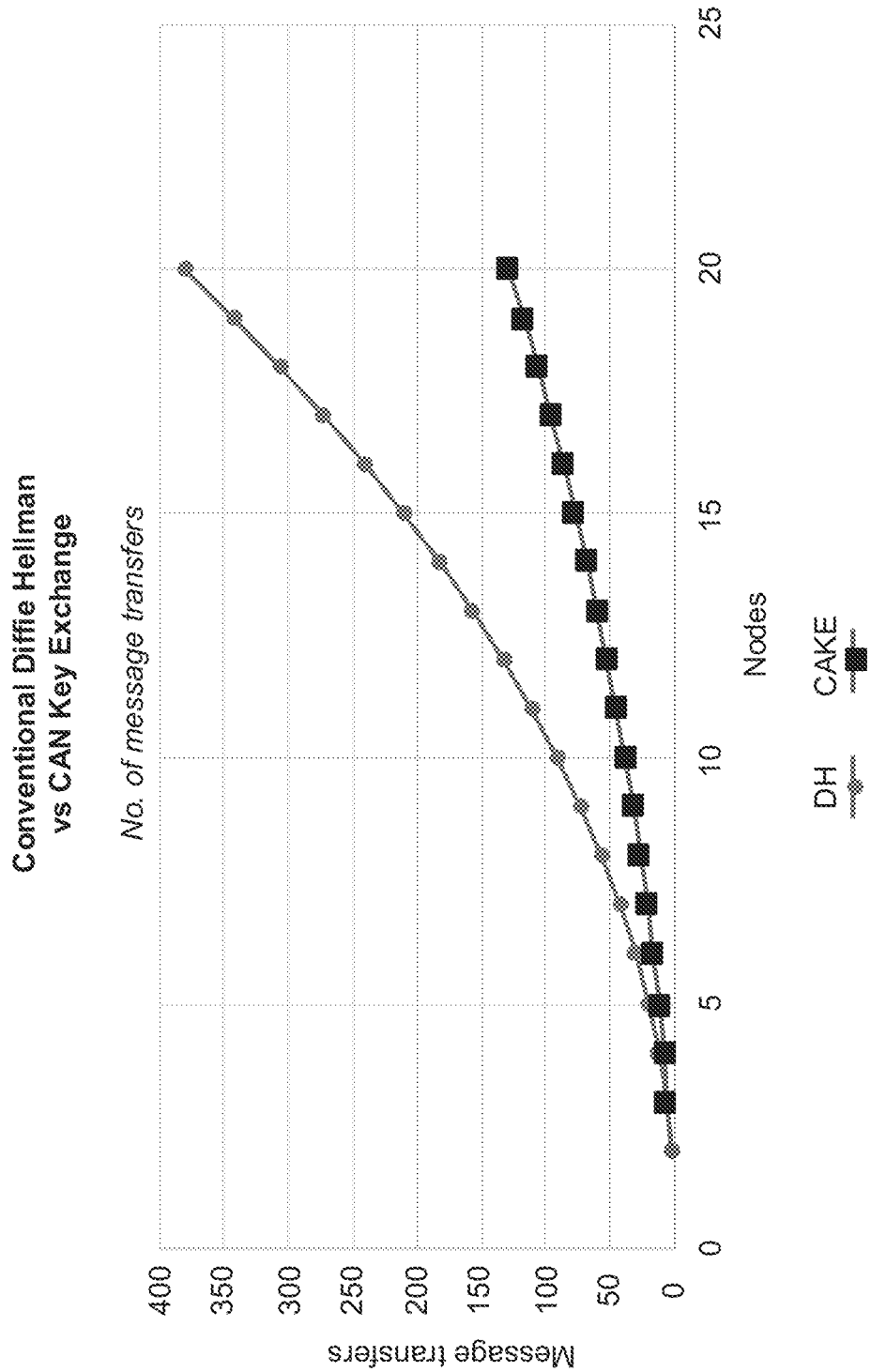

FIG. 3E is diagram illustrating a comparison between a number of messages required to achieve key exchange using a conventional DH key exchange and a number of messages required to achieve key exchange for a bus-based communication system 100 (identified as CAN key exchange (CAKE) in FIG. 3E) using the techniques described herein.

As shown in FIG. 3E, as the number of nodes increases, the number of messages needed when using the conventional DH key exchange increases, as does the number of messages needed when using the techniques described herein. However, the number of messages needed when using the techniques described herein increases at a lower rate, meaning that the techniques described herein reduce a number of messages needed to achieve key exchange in bus-based communication system 100, thereby reducing network traffic, while also conserving resources.

As indicated above, FIGS. 3A-3E are provided merely as examples. Other examples may differ from what is described with regard to FIGS. 3A-3E.

In this way, key exchange can be achieved in a bus-based communication system 100 in a manner that allows nodes 102 of the bus-based communication system 100 to derive a shared secret key at a given time, thereby improving data security while enabling simpler key configuration or reconfiguration (e.g., as compared to a bus-based communication system that uses a preconfigured shared secret key).

Further, key exchange in the bus-based communication system 100 in the manner described herein reduces a number of messages needed for nodes 102 of the bus-based communication system 100 to derive the shared secret key K (e.g., as compared to a conventional DH key exchange). Therefore, resource consumption and congestion on communication bus 104 of the bus-based communication system 100 is reduced.

In some implementations, as noted above, key exchange in the bus-based communication system 100 can be performed on a layer that allows relatively large payloads to be transmitted, such as a transport layer (sometimes referred to as a TPsec layer in, for example, a CAN XL system), meaning that longer shared secret keys can be derived, which improves data security.

FIG. 4 is a diagram of an example of a node 102 at which systems and/or methods described herein may be implemented. As shown in FIG. 4, node 102 may include a processor 404 and a transceiver 406 (e.g., Tx/Rx) connected to a communication bus 104 (e.g., a CAN bus).

Node 102 includes one or more devices associated with controlling one or more electrical systems and/or electrical subsystems based, for example, on sensor data provided by sensors connected to node 102 via a sensor interface component of node 102 (not shown), control data for controlling actuators connected to node 102 via an actuator interface component of node (not shown), and/or the like. In a vehicle system, for example, node 102 may include an ECU, an ECM, a PCM, a TCM, a BCM, a CCM, a CTM, a GEM, a BCM, a SCM, or another type of electrical system or electrical subsystem of a vehicle.

Processor 404 includes a device (e.g., one or more integrated circuits) that operates as an embedded system for providing the control functionality associated with node 102. For example, processor 404 includes one or more central processing units (CPUs), memories, and/or programmable input/output (I/O) peripherals that allow processor 404 to operate as an embedded system. In some examples, processor 404 may send information to and/or receive information from transceiver 406.

Transceiver 406 includes a component via which node 102 may transmit and receive information. For example, transceiver 406 may include a differential line transceiver, or a similar type of component. In some examples, transceiver 406 includes a transmit (Tx) component that allows node 102 to transmit information (e.g., to another node) via communication bus 104, and/or a receive (Rx) component that allows node 102 to receive information (e.g., from another node that is similar to node 102) via communication bus 104. In some examples, transceiver 406 may include a line driver for enabling the Tx component (to transmit information) or the Rx component (to receive information) at a given time. In some examples, transceiver 406 may be a LIN transceiver, a CAN transceiver, a FlexRay transceiver, an Ethernet transceiver, or another type of transceiver associated with another type of communication bus system. In some examples, node 102 may include multiple transceivers 406 of different types.

Communication bus 104 includes a bus for carrying information from or to node 102. In some examples, communication bus 104 may comprise a connection (e.g., including one or more terminals, wires, and/or connectors) via which multiple nodes 102 are connected to one another. In some examples, communication bus 104 may include a set of connections, each associated with one or more nodes 102. In some examples, communication bus 104 may be a CAN bus, a CAN FD bus, a CAN XL bus, a LIN bus, a FlexRay bus, an Ethernet bus, and/or another type of bus. In some examples, each transceiver 406 of node 102 may be connected to an associated communication bus 104.

The number and arrangement of devices and components shown in FIG. 4 is provided as an example. In practice, there may be additional devices and/or components, fewer devices and/or components, different devices and/or components, or differently arranged devices and/or components than those shown in FIG. 4. Furthermore, two or more devices and/or components shown in FIG. 4 may be implemented within a single device and/or component, or a single device and/or a single component shown in FIG. 4 may be implemented as multiple, distributed devices and/or components. Additionally, or alternatively, a set of devices and/or components (e.g., one or more devices and/or components) of FIG. 4 may perform one or more functions described as being performed by another set of devices and/or components of FIG. 4.

FIG. 5 is a flow chart of an example process 500 associated with providing CAN key exchange. In some implementations, one or more process blocks of FIG. 5 may be performed by a first node in a bus-based communication system (e.g., node 102 in a bus-based communication system 100, and/or the like).

As shown in FIG. 5, process 500 may include receiving a message on a communication bus of the bus-based communication system, the message having been broadcast on the communication bus by a second node of the bus-based communication system, and the message including a modular exponentiation associated with at least a private key of the second node (block 510). For example, the first node (e.g., using processor 404, transceiver 406, and/or the like) may receive a message on a communication bus (e.g., communication bus 104) of the bus-based communication system, as described above. In some implementations, the message may have been broadcast on the communication bus by a second node (e.g., another node 102 of the bus-based communication system 100). In some implementations, the message may include a modular exponentiation associated with at least a private key of the second node. For example, in some implementations, the modular exponentiation may be further associated with a private key of one or more other nodes of the bus-based communication system, such as a private key of a third node of the bus-based communication system (e.g., still another node 102 of the bus-based communication system 100).

As further shown in FIG. 5, process 500 may include computing, based at least in part on the modular exponentiation and a private key of the first node, a shared secret key associated with the bus-based communication system (block 520). For example, the first node (e.g., using processor 404, transceiver 406, and/or the like) may compute, based at least in part on the modular exponentiation and a private key of the first node, a shared secret key associated with the bus-based communication system, as described above.

Process 500 may include additional implementations, such as any single implementation or any combination of implementations described below and/or in connection with one or more other processes described elsewhere herein.

In some implementations, process 500 includes receiving a message including a modular exponentiation associated with a private key of the second node, the message is including the modular exponentiation associated with the private key of the second node having been broadcast on the communication bus by the second node.

In some implementations, process 500 includes computing, based at least in part on the modular exponentiation associated with the private key of the second node, a modular exponentiation associated with the private key of the first node and the private key of the second node, and broadcasting, on the communication bus, a message including the modular exponentiation associated with the private key of the first node and the private key of the second node.

In some implementations, process 500 includes receiving a message including a modular exponentiation associated with at least the private key of the third node; the message is including the modular exponentiation associated with the at least the private key of the third node having been broadcast on the communication bus by the third node.

In some implementations, process 500 includes computing, based at least in part on the modular exponentiation associated with the at least the private key of the third node, a modular exponentiation associated with the private key of the first node and the at least the private key of the third node; and broadcasting, on the communication bus, a message including the modular exponentiation associated with the private key of the first node and the at least the private key of the third node.

In some implementations, process 500 includes computing a modular exponentiation associated with a private key of the first node; and broadcasting, on the communication bus, a message including the modular exponentiation associated with the private key of the first node.

In some implementations, the bus-based communication system uses a CAN protocol; a CAN FD protocol; or a CAN XL protocol.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

It will be apparent that systems and/or methods described herein may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "only one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A bus-based communication system, comprising:
a communication bus connecting a plurality of nodes; and
a first node, of the plurality of nodes, configured to:
receive a first message on the communication bus, the first message having been broadcast on the communication bus by a second node of the plurality of nodes,
wherein the first message includes a first modular exponentiation associated with at least a private key of the second node;
broadcast a second message including a second modular exponentiation based at least in part on the first modular exponentiation and a private key of the first node,
wherein the second modular exponentiation is not based on private keys of all of a set of nodes associated with a key exchange; and
compute a shared secret key, associated with the plurality of nodes, based at least in part on the first modular exponentiation and the private key of the first node,
wherein the shared secret key is based on private keys of all of the set of nodes, including the first node and the second node, associated with the key exchange.

2. The bus-based communication system of claim 1, wherein the first node is further configured to:
receive a third message including a third modular exponentiation associated with the private key of the second node,
the third message including the third modular exponentiation associated with the private key of the second node having been broadcast on the communication bus by the second node.

3. The bus-based communication system of claim 2, wherein the first node is further configured to:
compute, based at least in part on the third modular exponentiation associated with the private key of the second node, a fourth modular exponentiation associated with the private key of the first node and the private key of the second node; and
broadcast, on the communication bus, a fourth message including the fourth modular exponentiation associated with the private key of the first node and the private key of the second node.

4. The bus-based communication system of claim 1, wherein the first node is further configured to:
receive a third message including a third modular exponentiation associated with at least a private key of a third node of the plurality of nodes,
the third message including the third modular exponentiation associated with at least the private key of the third node having been broadcast on the communication bus by the third node.

5. The bus-based communication system of claim 4, wherein the first node is further configured to:
compute, based at least in part on the third modular exponentiation associated with at least the private key of the third node, a fourth modular exponentiation associated with the private key of the first node and at least the private key of the third node; and
broadcast, on the communication bus, a fourth message including the fourth modular exponentiation associated with the private key of the first node and at least the private key of the third node.

6. The bus-based communication system of claim 1, wherein the first node is further configured to:
compute a third modular exponentiation associated with the private key of the first node; and
broadcast, on the communication bus, a third message including the third modular exponentiation associated with the private key of the first node.

7. The bus-based communication system of claim 1, wherein the bus-based communication system uses one of:
a controller area network (CAN) protocol;
a CAN with flexible data-rate (CAN FD) protocol; or
a CAN extra large (CAN XL) protocol.

8. A first node of a bus-based communication system, comprising:
one or more processors configured to:
receive a first message on a communication bus of the bus-based communication system, the first message having been broadcast on the communication bus by a second node of the bus-based communication system,
wherein the first message includes a first modular exponentiation associated with at least a private key of the second node;
broadcast a second message including a second modular exponentiation based at least in part on the first modular exponentiation and a private key of the first node,
wherein the second modular exponentiation is not based on private keys of all of a set of nodes associated with a key exchange; and
compute a shared secret key, associated with a plurality of nodes of the bus-based communication system, based at least in part on the modular exponentiation and the private key of the first node,
wherein the shared secret key is based on private keys of all of the set of nodes, including the first node and the second node, associated with the key exchange.

9. The first node of claim 8, wherein the shared secret key is further associated with at least a private key of a third node of the plurality of nodes.

10. The first node of claim 8, wherein the one or more processors are further configured to:

receive a third message including a third modular exponentiation associated with the private key of the second node,
the third message including the third modular exponentiation associated with the private key of the second node having been broadcast on the communication bus by the second node.

11. The first node of claim 10, wherein the one or more processors are further configured to:
compute, based at least in part on the third modular exponentiation associated with the private key of the second node, a fourth modular exponentiation associated with the private key of the first node and the private key of the second node; and
broadcast, on the communication bus, a fourth message including the fourth modular exponentiation associated with the private key of the first node and the private key of the second node.

12. The first node of claim 8, wherein the one or more processors are further configured to:
receive a third message including a third modular exponentiation associated with at least a private key of a third node of the plurality of nodes,
the third message including the third modular exponentiation associated with at least the private key of the third node having been broadcast on the communication bus by the third node.

13. The first node of claim 12, wherein the one or more processors are further configured to:
compute, based at least in part on the third modular exponentiation associated with the at least the private key of the third node, a fourth modular exponentiation associated with the private key of the first node and at least the private key of the third node; and
broadcast, on the communication bus, a fourth message including the fourth modular exponentiation associated with the private key of the first node and at least the private key of the third node.

14. The first node of claim 8, wherein the one or more processors are further configured to:
compute a third modular exponentiation associated with a private key of the first node; and
broadcast, on the communication bus, a third message including the third modular exponentiation associated with the private key of the first node.

15. The first node of claim 8, wherein the bus-based communication system uses one of:
a controller area network (CAN) protocol;
a CAN with flexible data-rate (CAN FD) protocol; or
a CAN extra large (CAN XL) protocol.

16. A method, comprising:
receiving, by a first node in a bus-based communication system, a first message on a communication bus of the bus-based communication system,
wherein the first message was broadcast on the communication bus by a second node of the bus-based communication system, and
wherein the first message includes a first modular exponentiation associated with at least a private key of the second node;
broadcasting, by the first node, a second message including a second modular exponentiation based at least in part on the first modular exponentiation and a private key of the first node,
wherein the second modular exponentiation is not based on private keys of all of a set of nodes associated with a key exchange; and
computing, by the first node and based at least in part on the first modular exponentiation and the private key of the first node, a shared secret key associated with the bus-based communication system,
wherein the shared secret key is based on private keys of all of the set of nodes, including the first node and the second node, associated with the key exchange.

17. The method of claim 16, wherein the modular exponentiation is further associated with at least a private key of a third node of the bus-based communication system.

18. The method of claim 16, further comprising:
receiving a third message including a third modular exponentiation associated with the private key of the second node,
the second message including the third modular exponentiation associated with the private key of the second node having been broadcast on the communication bus by the second node;
computing, based at least in part on the third modular exponentiation associated with the private key of the second node, a fourth modular exponentiation associated with the private key of the first node and the private key of the second node; and
broadcasting, on the communication bus, a fourth message including the fourth modular exponentiation associated with the private key of the first node and the private key of the second node.

19. The method of claim 16, further comprising:
receiving a third message including a third modular exponentiation associated with at least a private key of a third node,
the third message including the third modular exponentiation associated with at least the private key of the third node having been broadcast on the communication bus by the third node;
computing, based at least in part on the third modular exponentiation associated with at least the private key of the third node, a fourth modular exponentiation associated with the private key of the first node and at least the private key of the third node; and
broadcasting, on the communication bus, a fourth message including the fourth modular exponentiation associated with the private key of the first node and at least the private key of the third node.

20. The first node of claim 8, wherein the shared secret key corresponds to a third modular exponentiation, wherein the third modular exponentiation is based on the private keys of all of a set of nodes.

* * * * *